US008584003B2

(12) United States Patent
Leung

(10) Patent No.: US 8,584,003 B2
(45) Date of Patent: Nov. 12, 2013

(54) SYSTEM AND METHOD FOR SCHEMALESS DATA MAPPING WITH NESTED TABLES

(76) Inventor: Yiu-Ming Leung, Kirkland, WA (US)

( * ) Notice: Subject to any disclaimer, the term of this patent is extended or adjusted under 35 U.S.C. 154(b) by 1414 days.

(21) Appl. No.: 11/649,460

(22) Filed: Jan. 3, 2007

(65) Prior Publication Data

US 2007/0124318 A1    May 31, 2007

Related U.S. Application Data

(63) Continuation of application No. 10/805,896, filed on Mar. 22, 2004, now abandoned, which is a continuation-in-part of application No. 10/772,001, filed on Feb. 4, 2004, now abandoned.

(51) Int. Cl.
*G06F 17/00* (2006.01)

(52) U.S. Cl.
USPC .......................................... 715/212; 715/227

(58) Field of Classification Search
USPC .......................................... 715/202, 212, 227
See application file for complete search history.

(56) References Cited

U.S. PATENT DOCUMENTS

| 6,502,101 | B1 | 12/2002 | Verprauskus et al. | 707/101 |
|---|---|---|---|---|
| 6,631,497 | B1 * | 10/2003 | Jamshidi et al. | 715/205 |
| 6,804,677 | B2 * | 10/2004 | Shadmon et al. | 707/101 |
| 6,920,608 | B1 * | 7/2005 | Davis | 715/209 |
| 6,925,470 | B1 | 8/2005 | Sangudi et al. | 707/102 |
| 6,941,511 | B1 | 9/2005 | Hind et al. | 715/235 |
| 7,017,112 | B2 | 3/2006 | Collie et al. | 715/212 |
| 7,421,646 | B1 | 9/2008 | Leung | 715/212 |
| 2002/0120598 | A1 | 8/2002 | Shadmon et al. | 707/1 |
| 2003/0188264 | A1 | 10/2003 | Nawathe et al. | 715/513 |
| 2003/0212664 | A1 | 11/2003 | Breining et al. | 707/3 |
| 2005/0172217 | A1 | 8/2005 | Leung | 715/209 |

FOREIGN PATENT DOCUMENTS

| NZ | 239657 | 7/1995 |
|---|---|---|
| WO | WO 00/23915 | 4/2000 |

OTHER PUBLICATIONS

Lo, et al., "XAS: A System for Accessing Componentized, Virtual XML Documents," copyright 2001, IEEE, p. 493-502.*
Chan, et al., "Efficient filtering of XML documents with Xpath expressions." The VLDB Journal, vol. 11, Issue 4, Dec. 2002, p. 354-379.
John R. Durant, "Importing XML Maps, XML Lists, and Dynamic Chart Sources in Excel 2003" Jun. 2003; URL: http://msdn.microsoft.com/library/default.asp?url=library/en-us/odc_x12003_ta/html/odc_XMLLists.asp; pp. 1-10.

(Continued)

*Primary Examiner* — Amelia Rutledge
(74) *Attorney, Agent, or Firm* — Merchant & Gould

(57) ABSTRACT

A system and method for mapping payload data to a spreadsheet list. The present invention comprises a system for mapping payload data to a spreadsheet list while supporting the implementation of nested tables, without the use of a schema. After receiving a spreadsheet list, the present invention generates the parent path of each field path defined in the spreadsheet list. The longest parent path may be used to generate a set of nodes from the payload data. If more than one unique parent path qualifies as the longest parent path, then such parent paths may be designated as branch bottom paths. All other parent paths may then be associated with an appropriate branch bottom path. During the binding process, each branch bottom path may be evaluated to generate result nodes, which may be used to obtain the values of the fields of the spreadsheet list.

17 Claims, 9 Drawing Sheets

(56) References Cited

OTHER PUBLICATIONS

Kunicki, C.; "XML in Office XP: Part I" Online, May 2001, XP002278863, 9 pages.
Office Action mailed Oct. 26, 2010, in JP Application No. 2005-080091 (*w/translation*), 7 pages.
Rice, F.C.: "Transform XML Files with XSLT When Importing into Microsoft Excel 2002" Online, Jul. 2001, XP002366506, 11 pages.
Satoru Hosoi, "Impact of XML-completely-compliant Excel, Part 2 Let's Create XML-compliant Excel Book," Network World, vol. 9, No. 4, pp. 189-192, IDG Japan, Inc., Japan, Apr. 1, 2004 (*see Concise Statement in Transmittal Letter*).
Search Report mailed Aug. 11, 2006, in SG Application No. 200501674-6, 4 pages.
Search Report mailed May 30, 2006, in EP Application No. 05102141.8, 3 pages.
Torsten, et al. "Accelerating Xpath location steps," Proceedings of the 2002 ACM SIGMOD international conference on Management of data, 2002, p. 109-120.
Office Action mailed Jun. 16, 2011, in KR Pat. Application No. 10-2005-23677, *w/Translation*, 7 pages.
Office Action mailed May 16, 2011, in Taiwan Pat. Appl. No. 94106847, *w/Translation*, 6 pages.
Search Report dated May 9, 2011, issued in Taiwan Pat. Appl. No. 94106847, *w/Translation*, 2 pages.

\* cited by examiner

300 ⇘

```
303 → <ENTRY X2:ID="LIST1">
  306 → <RANGE>'EMPLOYEE LOOKUP'!R5C1</RANGE>
  309A → <XPATH>/CORP/DEPARTMENT</XPATH>
  312A → <FIELD>
    315A → <XSDTYPE>STRING</XSDTYPE>
    309B → <XPATH>@NAME</XPATH>
         </FIELD>
  312B → <FIELD>
    315B → <XSDTYPE>STRING</XSDTYPE>
    309C → <XPATH>DEPARTMENTID</XPATH>
         </FIELD>
  312C → <FIELD>
    315C → <XSDTYPE>STRING</XSDTYPE>
    309D → <XPATH>MANAGERS/PERSON/@NAME</XPATH>
         </FIELD>
  312D → <FIELD>
    315D → <XSDTYPE>STRING</XSDTYPE>
    309E → <XPATH>MANAGERS/PERSON/PERSONID</XPATH>
         </FIELD>
  312E → <FIELD>
    315E → <XSDTYPE>STRING</XSDTYPE>
    309F → <XPATH>CONTRACTORS/PERSON/@NAME</XPATH>
         </FIELD>
  312F → <FIELD>
    315F → <XSDTYPE>STRING</XSDTYPE>
    309G → <XPATH>CONTRACTORS/PERSON/PERSONID</XPATH>
         </FIELD>
       </ENTRY>
```

FIG. 3

```
401 → <CORP>
  403A → <DEPARTMENT NAME="ENGINEERING">
    406A → <DEPARTMENTID>1001</DEPARTMENTID>
    409A → <MANAGERS>
      412A → <PERSON NAME="JOHN">
        415A → <PERSONID>20001</PERSONID>
             </PERSON>
      412B → <PERSON NAME="PETER">
        415B → <PERSONID>20002</PERSONID>
             </PERSON>
           </MANAGERS>
    410A → <CONTRACTORS>
      412C → <PERSON NAME="DARREN">
        415C → <PERSONID>20005</PERSONID>
             </PERSON>
           </CONTRACTORS>
         </DEPARTMENT>
  403B → <DEPARTMENT NAME="HR">
    406B → <DEPARTMENTID>1002</DEPARTMENTID>
    409B → <MANAGERS>
      412D → <PERSON NAME="COREY">
        415D → <PERSONID>20003</PERSONID>
             </PERSON>
      412E → <PERSON NAME="PAT">
        415E → <PERSONID>20004</PERSONID>
             </PERSON>
           </MANAGERS>
    410B → <CONTRACTORS>
      412F → <PERSON NAME="DENISE">
        415F → <PERSONID>20006</PERSONID>
             </PERSON>
           </CONTRACTORS>
         </DEPARTMENT>
       </CORP>
```

*FIG. 4*

|   | A | B | C | D | C | D |
|---|---|---|---|---|---|---|
| 1 | DEPT NAME | DEPT ID | MANAGER NAME | MANAGER ID | CONTRACTOR NAME | CONTRACTOR ID |
| 2 | ENGINEERING | 1001 | JOHN | 20001 | | |
| 3 | ENGINEERING | 1001 | PETER | 20002 | | |
| 4 | HR | 1002 | COREY | 20003 | | |
| 5 | HR | 1002 | PAT | 20004 | | |
| 6 | ENGINEERING | 1001 | | | DARREN | 20005 |
| 7 | HR | 1002 | | | DENISE | 20006 |

FIG. 6

SYSTEM AND METHOD FOR SCHEMALESS DATA MAPPING WITH NESTED TABLES

RELATED APPLICATION

This utility patent application is a continuation of and claims the benefit under 35 United States Code §120 of U.S. patent application Ser. No. 10/805,896 filed Mar. 22, 2004, now abandoned entitled System and Method for Schemaless Data Mapping With Nested Tables, which is a continuation-in-part of U.S. patent application Ser. No. 10/772,001 filed on Feb. 4, 2004, now abandoned entitled System and Method for Schemaless Data Mapping, the disclosures of which are expressly incorporated by reference.

TECHNICAL FIELD

The present invention relates, generally, to data mapping systems and methods, and, more particularly, to data mapping systems and method without the use of a schema.

BACKGROUND OF THE INVENTION

As extensible markup language (XML) becomes more prevalent for moving data between applications, particularly over the Internet, popular applications have implemented web-related capabilities (e.g., document publishing to the web) through the use of XML. One such application is MICROSOFT EXCEL offered by Microsoft Corporation of Redmond, Wash. XML lists were introduced to display XML payload data conforming to a predetermined schema. Typically, the relationship between the XML payload data and the makeup of an XML list is defined by an XML map, which is part of the spreadsheet workbook definition. The XML map may determine the location of an XML list in the workbook, the number of columns that will be mapped, and the type of element or attribute associated with each column. An XML Spreadsheet (XMLSS) file describes the spreadsheet workbook, including all XML lists that the workbook contains. Elements of the predetermined schema are mapped onto a grid to create a mapped XML list, with each row representing a node instance of the payload data. Generally, the schema defines the shape of the XML payload data.

In order for a spreadsheet application to provide effective interactivity over the Internet, the spreadsheet application must ensure that a given workbook is loaded and displayed over a network as it would be on a stand-alone system. A critical part of this fidelity is the mapping of payload data into XML lists. Such mapping requires the use of a predetermined schema.

Unfortunately, the reliance of a predetermined schema to map XML payload data to an XML list may be problematic. For example, if the schema is unavailable or corrupt the data may not be properly mapped. Additionally, applying a schema to payload data and XML lists may require intensive processing by a computer processing unit (CPU). Such a burden to the processor may be impractical or disadvantageous for computing systems such as servers or hand-held devices.

Mapping payload data to a spreadsheet list without the use of a schema may be difficult because of the complexity of mapping nested tables. Nested tables are often used to display intricate payload data so that a table may comprise multiple tables (e.g., sub-tables). The recursive nature of nested tables allows for the display of interrelated payload data.

Accordingly, there is a need in the art for a system and method for mapping payload data to a spreadsheet list without the use of a schema.

There is also a need in the art for a system and method for mapping payload data to a spreadsheet list without the use of a schema, wherein the result is substantially similar to data mapping with a schema.

Further, there is a need in the art for a system and method for mapping payload data to a spreadsheet list while supporting the implementation of nested tables, without the use of a schema.

SUMMARY OF THE-INVENTION

Broadly described, the present invention comprises a system and method for mapping payload data to a spreadsheet list (e.g., XML list) of spreadsheet data. More particularly, the present invention comprises a system for mapping payload data to a spreadsheet list while supporting the implementation of nested tables, without the use of a schema. After receiving a spreadsheet list, the present invention generates the parent path of each field path defined in the spreadsheet list. The longest parent path (e.g., bottom path) may be used to generate a set of bind nodes from the payload data. The present invention may map each bind node to a row in the spreadsheet list. By traversing from each bind node using the bottom path and the field paths, the present invention may obtain the values of all of the other fields in the rows of the spreadsheet list. Alternatively, if more than one parent path qualifies as the longest parent path and such parent paths are not equal to or a subset of each other, then such parent patents may be designated as branch bottom paths. All other parent paths may then be associated with an appropriate branch bottom path. During the binding process, each branch bottom path may be evaluated to generate result nodes, which may be used to obtain the values of the fields of the spreadsheet list.

Advantageously, the present invention maps payload data to a spreadsheet list without the use of a schema. The present invention provides a result substantially similar to one generated by using a schema. Additionally, the present invention supports the implementation of nested tables within a spreadsheet list. Accordingly, the present invention eliminates a dependency on the schema to map payload data to a spreadsheet list and, therefore, reduces the potential of data mapping failure. Additionally, the elimination of such a dependency (e.g., processor-intensive data mapping) frees the valuable resources of the computer processing unit for more important tasks.

Other features and advantages of the present invention will become apparent upon reading and understanding the present specification when taken in conjunction with the appended drawings.

BRIEF DESCRIPTION OF DRAWINGS

FIG. 3 displays a pseudo-code representation of spreadsheet data including a spreadsheet list in accordance with an exemplary embodiment of the present invention.

FIG. 4 displays a pseudo-code representation of payload data in accordance with an exemplary embodiment of the present invention.

FIG. 6 displays a block diagram of a mapped spreadsheet list in accordance with an exemplary embodiment of the present invention.

DETAILED DESCRIPTION OF THE INVENTION

Figure 1:
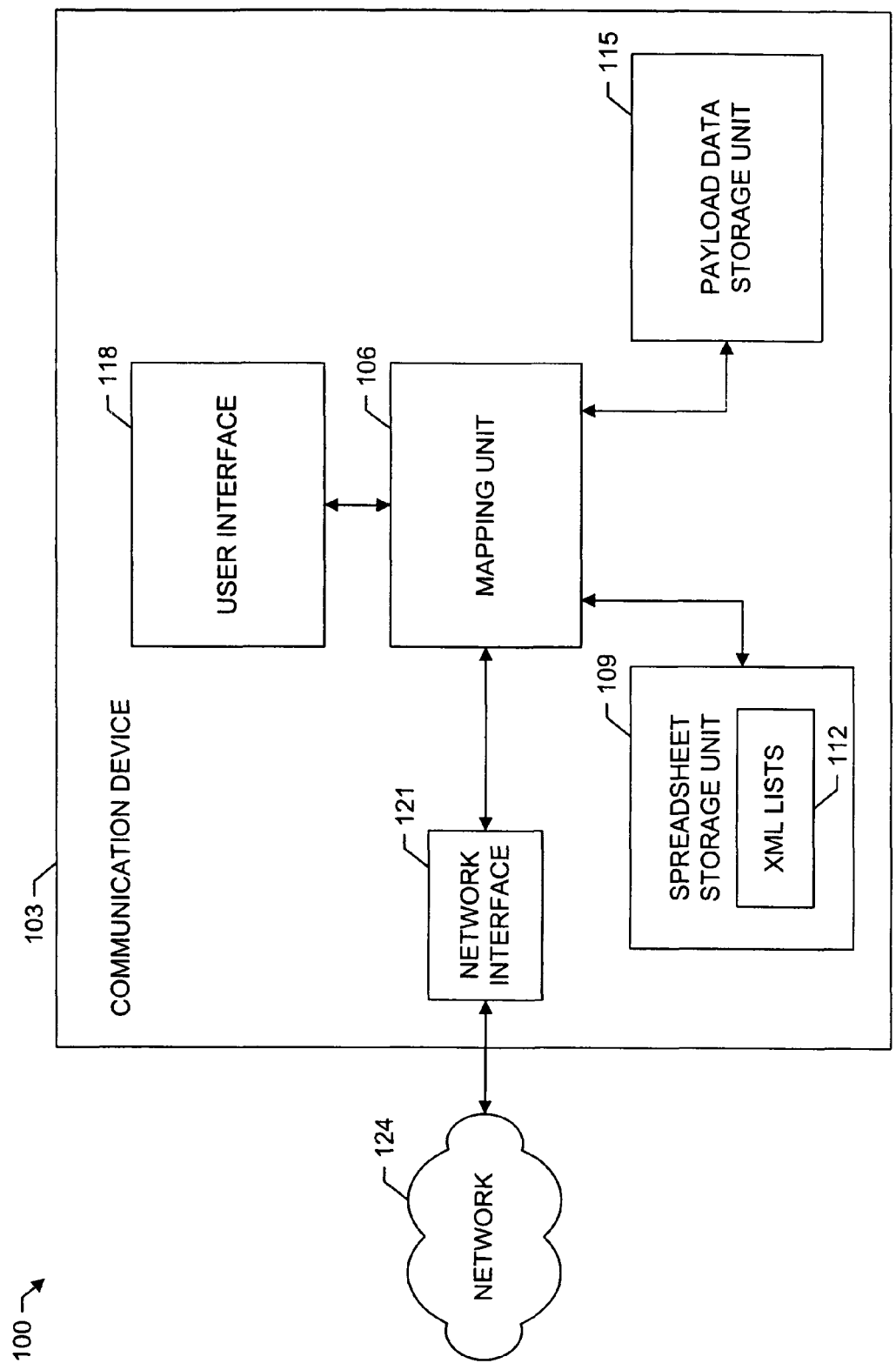
FIG. 1 displays a block diagram representation of a spreadsheet data mapping system in accordance with an exemplary embodiment of the present invention.

Referring now to the drawings, in which like numerals represent like components or steps throughout the several views, FIG. 1 displays a block diagram representation of a spreadsheet data mapping system 100 in accordance with an exemplary embodiment of the present invention. The spreadsheet data mapping system 100 may comprise a communication device 103 including, but not limited to, a spreadsheet storage unit 109, a payload data storage unit 105, and a mapping unit 106. The communication device 103 may be supported by hardware and software components similar to those found in well-known computing systems, environments, and/or configurations, described more fully below with reference to FIG. 2.

The spreadsheet storage unit 109 communicatively connects to the mapping unit 106. The spreadsheet storage unit 109 stores spreadsheet data including spreadsheet lists such as, but not limited to, extensible markup language (XML) lists 112, described more fully below with reference to FIG. 3. The spreadsheet storage unit 109 comprises a memory device capable of storing and retrieving data including, but not limited to, random access memory (RAM), flash memory, magnetic memory devices, optical memory devices, hard disk drives, removable volatile or non-volatile memory devices, optical storage mediums, magnetic storage mediums, or RAM memory cards. Alternatively, the spreadsheet storage unit 109 may comprise a remote storage facility accessible through a wired and/or wireless network system. Additionally, the spreadsheet storage unit 109 may comprise a memory system including a multi-stage system of primary and secondary memory devices, as described above. The primary memory device and secondary memory device may operate as a cache for each other or the second memory device may serve as a backup to the primary memory device. In yet another arrangement, the spreadsheet storage unit 109 may comprise a memory device configured as a simple database file or as a searchable, relational database using a query language, such as SQL.

The payload data storage unit 115 communicatively connects to the mapping unit 106. The payload data storage unit 115 stores payload data, wherein the payload data may be mapped to a corresponding XML list 112 of the spreadsheet data. Payload data is described more fully below with reference to FIG. 4. The payload data storage unit 115 comprises a memory device similar to the memory devices described above with reference to the spreadsheet storage unit 109.

The mapping unit 106 communicatively connects to the spreadsheet storage unit 109 and the payload data storage unit 115. The mapping unit 106 is configured with hardware and software, (see FIG. 2) appropriate to perform tasks and provide capabilities and functionality as described herein. The mapping unit 106 may be adapted to map payload data stored on the payload data storage unit 115 to XML lists 112 stored on the spreadsheet storage unit 109.

In operation, the mapping unit 106 receives spreadsheet data from the spreadsheet storage unit 109 and receives payload data from the payload data storage unit 115. The spreadsheet data may include XML lists 112 that may generally be defined by a group of fields (also referred to herein as "columns"). Typically, a field may be calculated or mapped. Calculated fields may be defined by a formula or constant value, while mapped fields may be defined by a "path" or "pointer" to payload data. The mapping unit 106 may utilize the field paths to obtain a list of nodes (e.g., sometimes referred to as "bind nodes") from the payload data, whereby each node may then be mapped by the mapping unit 106 to a row in an XML list 112. The mapping unit 106 may obtain values from the payload data for all the fields within the XML list 112 by following a path from the nodes to the desired fields.

In an alternative embodiment of the present invention, the communication device 103 further comprises a user interface 118 that may be adapted to display data to a user and receive user input. The user interface 118 communicatively connects to the mapping unit 106. The mapping unit 106 may provide mapped XML lists 112 to the user interface 118, which may display the mapped XML lists 112 to the user via a display (not shown). One skilled in the art will recognize that the user interface 118 may be designed in a variety of embodiments and formats and may range from a simple to a more complex configuration. In an exemplary embodiment of the present invention, the user interface 118 may comprise a keypad, display, touch screen or other convenient device, and may also comprise program modules or machine instructions that perform the predetermined tasks, which instructions may be executed on a processing unit 212.

Additionally, the communication device 103 may comprise a network interface 121 for facilitating communication from the communication device 103 to a network 124. The network interface 121 communicatively connects to the mapping unit 106 and a network 124. The mapping unit 106 may provide mapped XML lists 112 to the network interface 121, which may provide the mapped XML lists 112 to another communication device within the network 124. The network interface 121 typically may be a hardware device, such as a network interface card or an expansion card of the communication device 103, which facilitates connectivity between the communication device 103 and the network 124. Although not shown in FIG. 1, the network interface 121 may comprise a radio transmitter and receiver which enable wireless communication between the communication device 103 and an access point (not shown) of the network 124.

One skilled in the art will recognize that a network 124 typically comprises the infrastructure and facilities appropriate to connect a group of two or more communication devices 103 (including, without limitation, a plurality of servers or client devices). Such a network 124, communication device 103, and servers may be configured in multiple topologies including, but not limited to, star, bus, or ring configurations. Also, a network 124, communication device 103, and servers may be broadly categorized as belonging toga particular architecture including, but not limited to, peer-to-peer or client/server architectures. The network 124 may additionally be classified by the geographical location of the communication devices 103 or servers and the types thereof. For example, a network 124 connecting a plurality of computer systems or servers located proximate to each other, such as within a building, is referred to as a local-area network (LAN); if the computer systems are located farther apart, the network 124 is generally referred to as a wide-area network (WAN), such as the Internet; if the computer systems are located within a limited geographical area, such as a university campus or military establishment, the network 124 is referred to as a campus-area network (CAN); if the computer systems are connected together within a city or town, the network 124 is referred to as a metropolitan-area network (MAN); and if the computer systems are connected together within a user's home, the network 124 is referred to as a home-area network (HAN).

One skilled in the art will recognize that connecting communicatively may include or require any appropriate type of connection for the bi-directional communication of signals and/or media including, but not limited to, analog, digital, wired and wireless communication channels. Such communication channels may utilize, but not be limited to, copper wire, optical fiber, radio frequency, infrared, satellite, or other facilities and media.

While several embodiments of the present invention refer to XML spreadsheet data, XML lists, and XML payload data, one skilled in the art will recognize that other types of data configurations may be used within the scope of the invention and, therefore, the present invention is not limited to data configured in XML.

Figure 2:
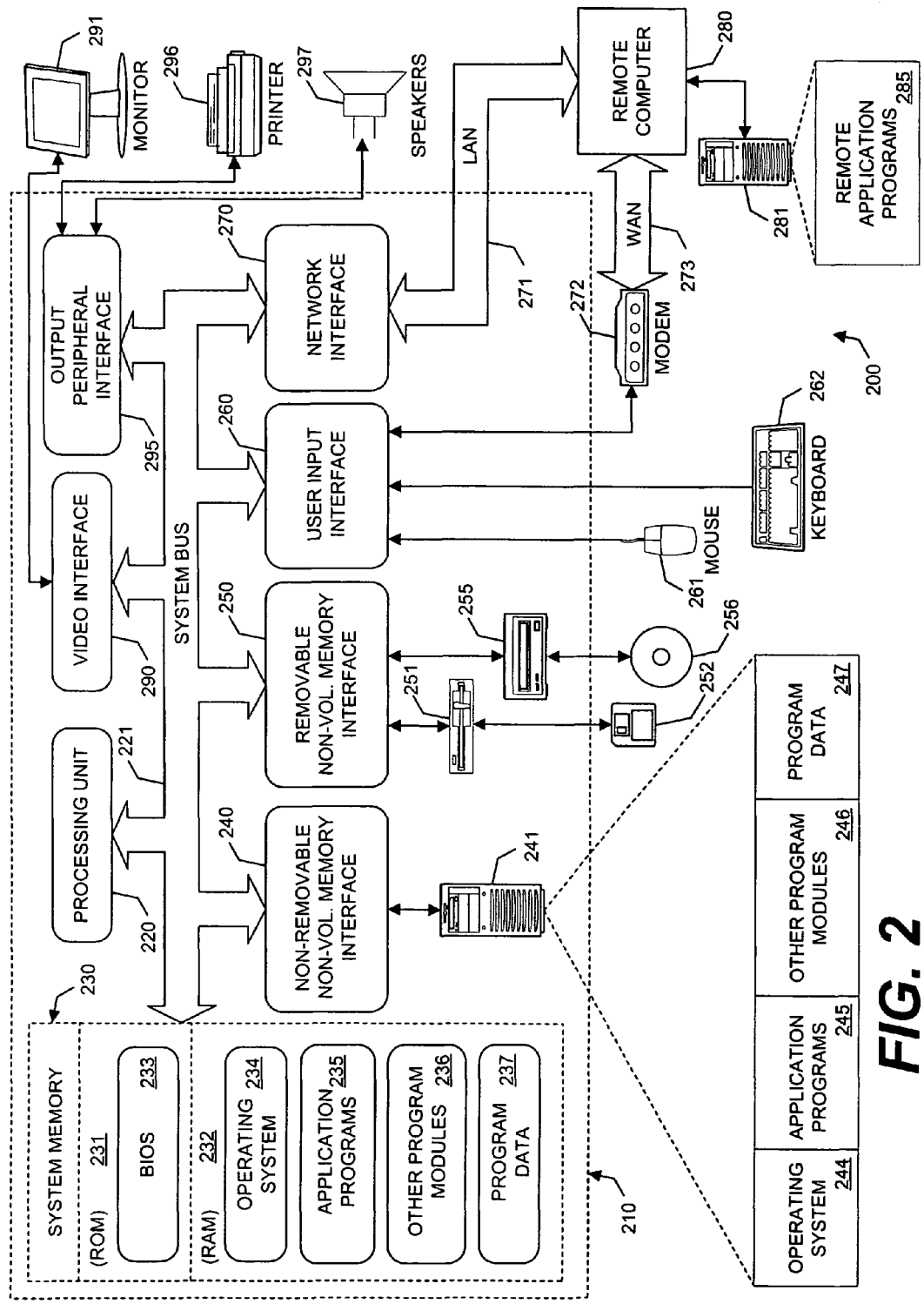
FIG. 2 displays a block diagram representation of a computing environment and computer systems thereof which the present invention may utilize in accordance with an exemplary embodiment thereof.

FIG. 2 displays a block diagram representation of a computing environment 200 and computer systems 210, 280 thereof which the present invention may utilize in accordance with an exemplary embodiment thereof. The computing environment 200 and computer systems 210, 280 thereof represent only one example of a suitable computing environment and computer systems for the practice of the present invention and are not intended to suggest any limitation as to the scope of use or functionality of the invention. Nor should the computer systems 210, 280 be interpreted as having any dependency or requirement relating to any one or communication of components illustrated in the exemplary computing environment 200.

Hence, it should be understood that the present invention is operational with numerous other general purpose or special purpose computing system environments or configurations. Examples of well-known communication devices 103, computing systems, environments, and/or configurations that may be appropriate or suitable for use with the present invention include, but are not limited to, personal computers, server computers, hand-held or laptop devices, multiprocessor systems, microprocessor-based systems, set top boxes, programmable consumer electronics, network personal computers, minicomputers, mainframe computers, distributed computing environments that include any of the above systems or devices, and the like.

The present invention may also be described in the general context of comprising computer-executable instructions, such as program modules, being executed by a computer system. Generally, program modules include routines, programs, programming, objects, components, data, and/or data structures that perform particular tasks or implement particular abstract data types. The present invention may be practiced in distributed computing environments where tasks are performed by remote processing devices that are linked through a communications network. In a distributed computing environment, program modules may be located in both local and remote computer storage media, including, without limitation, in memory-storage devices.

With reference to FIG. 2, an exemplary computing environment 200 of the present invention includes a general purpose computing device in the form of a computer system 210. Components of computer system 210 may include, but are not limited to, a processing unit 220, a system memory 230, and a system bus 221 that couples various system components including the system memory 230 to the processing unit 220 for bi-directional data and/or instruction communication. The system bus 221 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (i.e., also known as the "Mezzanine bus").

Computer system 210 typically includes a variety of computer-readable media. Computer-readable media may comprise an available media that may be accessed by, read from, or written to by computer system 210 and may include both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data, data structures, program modules, programs, programming, or routines. Computer storage media includes, but is not limited to, RAM, ROM, EEPROM, flash memory or other memory technology, CD-ROM, digital versatile disks (DVD) or other optical disk storage, magnetic cassettes, magnetic tape, magneto-optical storage devices, magnetic disk storage or other magnetic storage devices, or any other medium which may be used to store the desired information and which may be accessed by computer system 210. Communication media typically embodies computer-readable instructions, data, data structures, program modules, programs, programming, or routines in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer-readable media.

The system memory 230 includes computer-storage media in the form of volatile and/or nonvolatile memory such as read only memory (ROM) 231 and random access memory (RAM) 232. A basic input/output system 233 (BIOS), containing the basic routines that direct the transfer of information between elements within computer 210, such as during start-up, is typically stored in ROM 231. RAM 232 typically stores data and/or program instructions that are immediately accessible to and/or presently being operated on by processing unit 220. By way of example, and not limitation, FIG. 2 illustrates operating system 234, application programs 235, other program modules 236, and program data 237 which may be resident in RAM 232, in whole or in part, from time-to-time.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that may be included in the exemplary computing environment 200 include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives 241, 251, 255 and their associated computer storage media described above and illustrated in FIG. 2, provide storage of computer-readable instructions, data, data structures, program modules, programs, programming, or routines for computer system 210. In FIG. 2, for example, hard disk drive 241 is illustrated as storing operating system 244, application programs 245, other program modules 246, and program data 247. Note that these components may either be the same as or different from operating system 234, application programs 235, other program modules 236, and program data 237. Operating system 244, application programs 245, other program modules 246, and program data 247 are given different numbers to illustrate that, at a minimum, they are different copies of operating system 234, application programs 235, other program modules 236, and program data 237. A user may enter commands and information into computer system 210 through connected input devices such as a keyboard 262 and pointing device 261, commonly referred to as a mouse, trackball or touch pad. Other connected input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor 291, computer system 210 may also include other peripheral output devices such as speakers 297 and printer 296, which may be connected through an output peripheral interface 295.

The computer system 210 may operate in a networked environment using bi-directional communication connection links to one or more remote computer systems, such as a remote computer system 280. The remote computer system 280 may be a personal computer, a laptop computer, a server computer, a router, a network PC, a peer device or other common network node, and typically includes many or all of the elements described above relative to the computer system 210, although only a memory storage device 281 of remote computer system 280 has been illustrated in FIG. 2. The bi-directional communication connection links depicted in FIG. 2 include a local area network (LAN) 271 and a wide area network (WAN) 273, but may also include other networks. Such networks are commonplace in offices, enterprise-wide computer networks, intranets and the Internet.

When communicatively connected to a LAN 271, the computer system 210 connects to the LAN 271 through a network interface or adapter 270. When communicatively connected to a WAN 273, the computer system 210 typically includes a modem 272 or other means for establishing a communication link over the WAN 273, such as the Internet. The modem 272, which may be internal or external, may be connected to the system bus 221 via the user input interface 260, or other appropriate mechanism. In a-networked environment, program modules depicted relative to the computer system 210, or portions thereof, may be stored in the remote memory storage device 281. By way of example, and not limitation, FIG. 2 illustrates remote application programs 285 as residing in memory storage device 281. It will be appreciated that the network connections shown are exemplary and other means of establishing a bi-directional communication link between the computers may be used.

FIG. 3 displays a pseudo-code representation 300 of spreadsheet data including a spreadsheet list 112 in accordance with an exemplary embodiment of the present invention. As discussed above, the spreadsheet storage unit 109 includes spreadsheet lists 112 that may be mapped with payload data by the mapping unit 106. In an exemplary embodiment of the present invention, the spreadsheet lists 112 are configured in XML code and, therefore, are hereinafter referred to as XML lists 112.

XML provides customizable tags that permit the definition, validation, transmission, and interpretation of data between a plurality of systems. One skilled in the art will recognize that XML is derived from standard generalized markup language (SGML) and provides a widely-accepted code format for the configuration of data. Generally, XML tags are commands used within a document or code that indicate how the portion of a document or code should be formatted or interpreted. XML tags are typically paired and include a beginning tag and an ending tag. The beginning tag is often represented by a tag name between a less than ("<") and greater than (">") symbol. The ending tag is usually identical to the beginning tag except that after the less than symbol ("<") there is a forward slash ("/"). For example, and not limitation, the range element 306 begins with a "<range>" tag and ends with a "</range>" tag. All of the text or code between the beginning "<range>" tag and the ending "</range>" tag may be interpreted as part of the range element 306.

More specifically, FIG. 3 displays a portion of an XML spreadsheet (XMLSS), which describes a spreadsheet workbook, including the XML list 112 contained therein. The entry element 303 (e.g., <entry x2:id="list1"> . . . </entry>) represents a single XML list 112 within the spreadsheet data. The XML list 112 may be defined by a group of columns referred to as fields, which may be represented in the XML list 112 by the field element 312A-312F (e.g., <field> . . . </field>). The field elements 312A-312F, therefore, represent the columns resulting from the mapping of payload data to the XML list 112 by the mapping unit 106.

A field may be calculated or mapped. A calculated field may be defined by either a formula or a constant value. A mapped field may be defined by a path to the payload data. As shown in FIG. 3, a field path may be represented in the XML list 112 by the xpath element 309B-309G (e.g., <xpath> . . . </xpath>). The entry element 303 may also have a path (e.g., sometimes referred to as the "root path") and may also be represented by an xpath element 309A. The field path is a relative xpath 309B-309G to the entry path and, therefore, the full path to a field requires concatenating the entry path with the field path. For example and not limitation, the field path represented by xpath element 309C of field element 312B is "DEPARTMENTID". The full path of the field represented by field element 312B, however, requires combining the entry xpath represented by xpath element 309A with the field path represented by xpath element 309C and, therefore, results in a full path of "/CORP/DEPARTMENT/DEPARTMENTID".

A field may also be associated with a particular data or definition type such as, but not limited to, a string, a variable, or an integer. A field's data or definition type may be represented, as shown in FIG. 3, by an xsdtype element 315A-

315F. Using the example above, the data or definition type represented by xsdtype 315B of the field represented by field element 312B is "STRING".

One skilled in the art will recognize that an XML-list 112 may be configured in numerous arrangements and may comprise a variety of fields and paths. Accordingly, the spreadsheet data displayed in FIG. 3 is for illustrative purposes only and does not limit the scope of the present invention.

FIG. 4 displays a pseudo-code representation 400 of payload data in accordance with an exemplary embodiment of the present invention. As discussed above, the payload data storage unit 115 includes payload data that may be mapped to an XML list 112 of the spreadsheet data. In an exemplary embodiment of the present invention, the payload data is configured in XML code. Payload data, generally, corresponds to the fields defined or described in the XML list 112. Accordingly, the paths defined in an XML list 112 may correlate to XML tags within the payload data.

For example and not limitation, the payload data displayed in FIG. 4 relates to the XML list defined in FIG. 3. More specifically, the payload elements 403, 406, 409, 410, 412, 415 shown in FIG. 4 correspond to the full field paths shown in FIG. 3. TABLE 1 displays the correlation between the full field paths of FIG. 3 with the payload elements of FIG. 4.

TABLE 1

/CORP/DEPARTMENT/@NAME

```
<CORP>
  <DEPARTMENT NAME="ENGINEERING">
  ...
  </DEPARTMENT>
  <DEPARTMENT NAME="HR">
  ...
  </DEPARTMENT>
</CORP>
```
/CORP/DEPARTMENT/DEPARTMENTID

```
<CORP>
  <DEPARTMENT...>
    <DEPARTMENTID>1001</DEPARTMENTID>
  ...
  </DEPARTMENT>
  <DEPARTMENT...>
    <DEPARTMENTID>1002</DEPARTMENTID>
  ...
  </DEPARTMENT>
</CORP>
```
/CORP/DEPARTMENT/MANAGERS/PERSON/@NAME

```
<CORP>
  <DEPARTMENT...>
  ...
    <MANAGERS>
      <PERSON NAME="JOHN">...</PERSON>
      <PERSON NAME="PETER">...</PERSON>
    </MANAGERS>
  </DEPARTMENT>
  <DEPARTMENT...>
  ...
    <MANAGERS>
      <PERSON NAME="COREY">...</PERSON>
      <PERSON NAME="PAT">...</PERSON>
    </MANAGERS>
  </DEPARTMENT>
</CORP>
```
/CORP/DEPARTMENT/MANAGERS/PERSON/PERSONID

```
<CORP>
  <DEPARTMENT...>
  ...
    <MANAGERS>
      <PERSON...><PERSONID>20001</PERSONID></PERSON>
      <PERSON...><PERSONID>20002</PERSONID></PERSON>
    </MANAGERS>
```

TABLE 1-continued

```
  </DEPARTMENT>
  <DEPARTMENT...>
  ...
    <MANAGERS>
      <PERSON...><PERSONID>20002</PERSONID></PERSON>
      <PERSON...><PERSONID>20003</PERSONID></PERSON>
    </MANAGERS>
  </DEPARTMENT>
</CORP>
```
/CORP/DEPARTMENT/CONTRACTORS/PERSON/@NAME

```
<CORP>
  <DEPARTMENT...>
  ...
    <CONTRACTORS>
      <PERSON NAME="DARREN">...</PERSON>
    </CONTRACTORS>
  </DEPARTMENT>
  <DEPARTMENT...>
  ...
    <CONTRACTORS>
      <PERSON NAME="DENISE">...</PERSON>
    </CONTRACTORS>
  </DEPARTMENT>
</CORP>
```
/CORP/DEPARTMENT/CONTRACTORS/PERSON/PERSONID

```
<CORP>
  <DEPARTMENT...>
  ...
    <CONTRACTORS>
      <PERSON...><PERSONID>20005</PERSONID></PERSON>
    </CONTRACTORS>
  </DEPARTMENT>
  <DEPARTMENT...>
  ...
    <CONTRACTORS>
      <PERSON...><PERSONID>20006</PERSONID></PERSON>
    </CONTRACTORS>
  </DEPARTMENT>
</CORP>
```

As shown in Table 1, the department name elements 403A, 403B correspond to the full field path of "/CORP/DEPARTMENT/@NAME"; the departmentid elements 406A, 406B correspond to the full field path of "/CORP/DEPARTMENT/DEPARTMENTID"; the person name elements 412A-412F correspond to the full field paths of "/CORP/DEPARTMENT/MANAGERS/PERSON/@NAME" and "/CORP/DEPARTMENT/CONTRACTORS/PERSON/@NAME"; and the personid elements 415A-415F correspond to the full field paths of "/CORP/DEPARTMENT/MANAGERS/PERSON/PERSONID" and "CORP/DEPARTMENT/CONTRACTORS/PERSON/PERSONID". In an exemplary embodiment of the present invention, the "/@" symbols in a field path indicate that the field is an attribute, while the "/" symbol in a field path indicates that the field is an element. Thus, "NAME" is an attribute of "DEPARTMENT" as indicated by the path "/CORP/DEPARTMENT/@NAME", while "DEPARTMENTID" is an element of "DEPARTMENT" as indicated by the path "/CORP/DEPARTMENT/DEPARTMENTID".

One skilled in the art will recognize that the configuration of the payload data may depend on or conform to the configuration of the XML lists 112. Accordingly, the payload data represented in FIG. 4 is for illustrative purposes only and does not limit the scope of the present invention.

Figure 5:
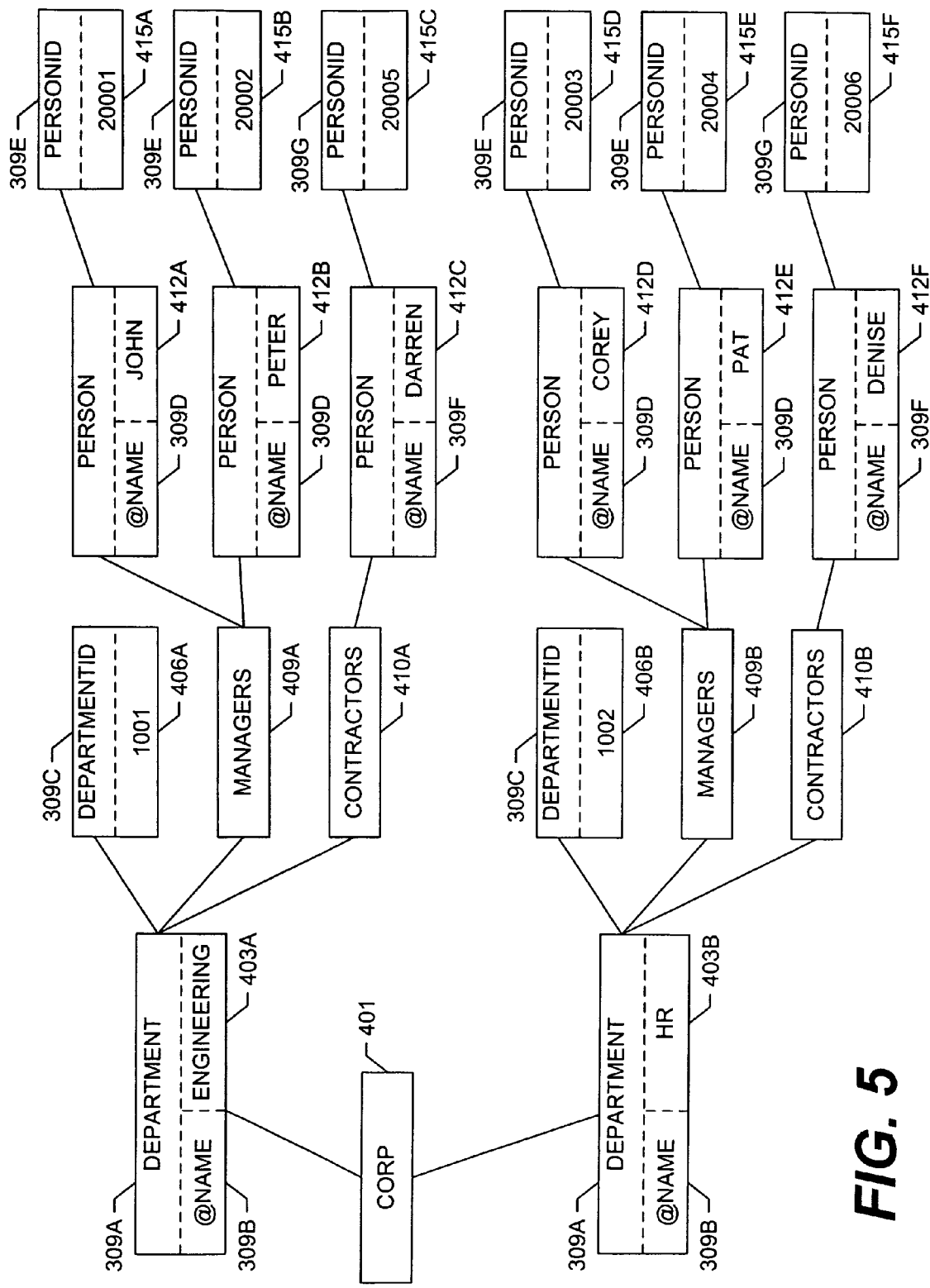
FIG. 5 displays a block diagram of payload data in accordance with an exemplary embodiment of the present invention.

FIG. 5 displays a block diagram of payload data in accordance with an exemplary embodiment of the present invention. The payload data displayed in FIG. 5 resembles the payload data discussed above with reference to FIG. 4, except without XML element tags. More specifically, FIG. 5 illustrates the hierarchical characteristics of the field paths of the spreadsheet data (see FIG. 3) and the payload data associated therewith.

In an exemplary embodiment of the present invention, the mapping unit 106 may determine the "parent" path of each field path in an XML list 112 (described more fully below with reference to FIG. 7). A parent path of a particular field path may be determined by following the field path one step back in the path. In other words, the parent path is one step back in the hierarchy than the field path. For example and not limitation, the field path "/CORP/DEPARTMENT/MANAGERS/PERSON/PERSONID/" may have a parent path of "/CORP/DEPARTMENT/MANAGERS/PERSON". Additionally, a parent path may be calculated for attribute and element fields. Thus, an attribute field path of "/a/b/@c" and an element field path of "/a/b/c" may have the same parent path of "/a/b".

FIG. 5 also illustrates how a field path may be followed to the corresponding payload data. For example and not limitation, the mapping unit 106 may follow the field path of "/CORP/DEPARTMENT/DEPARTMENTID" and discover the corresponding values of "1001" and "1002". Conversely, a field path may be determined from payload data. For example and not limitation, the payload data "John" may have a corresponding field path of "/CORP/DEPARTMENT/MANAGERS/PERSON/@NAME".

FIG. 6 displays a block diagram of a mapped spreadsheet list 112 in accordance with an exemplary embodiment of the present invention. As described above, the mapping unit 106 may map the payload data to an XML list 112 of the spreadsheet data. Although such mapping does not rely on a schema, the resulting mapped spreadsheet list 112 substantially resembles that of a "schema-mapped" spreadsheet list.

In an exemplary embodiment of the present invention, the mapping unit 106 may designate a "bottom" path for the XML list 112 (described more fully below with reference to FIG. 7). Typically, the bottom path is the longest path of the previously generated parent paths (described above with reference to FIG. 5). If more than one parent path qualifies as the longest path, then either the parent path that was generated first may be designated as the bottom path or each of the parent paths that may qualify as the longest path may be designated as a branch bottom path (described more fully below with reference to FIG. 7).

The mapping unit 106 may use the bottom path to designate the nodes, such as bind nodes, of the XML list 112. Typically, the nodes may be assigned to a row in the mapped XML list 112. The nodes may act as the index for each row of the XML list 112. More specifically, the nodes may indicate the number of rows that exist in the mapped XML list 112.

For example and not limitation, the parent paths of the fields illustrated in FIG. 3 are "/CORP/DEPARTMENT" (e.g., the parent path of "/CORP/DEPARTMENT/@NAME"), "/CORP/DEPARTMENT" (e.g., the parent path of "/CORP/DEPARTMENT/DEPARTMENTID"), "/CORP/DEPARTMENT/MANAGERS/PERSON" (e.g., the parent path of "/CORP/DEPARTMENT/MANAGERS/PERSON/@NAME"), "/CORP/DEPARTMENT/MANAGERS/PERSON" (e.g., the parent path of "/CORP/DEPARTMENT/MANAGERS/PERSON/PERSONID"), "CORP/DEPARTMENT/CONTRACTORS/PERSON" (e.g., the parent path of "/CORP/DEPARTMENT/CONTRACTORS/PERSON/@NAME"), and "/CORP/DEPARTMENT/CONTRACTORS/PERSON" (e.g., the parent path of "/CORP/DEPARTMENT/CONTRACTORS/PERSON/PERSONID"). The mapping unit 106 may designate "/CORP/DEPARTMENT/MANAGERS/PERSON" (e.g., the parent path of "/CORP/DEPARTMENT/MANAGERS/PERSON/@NAME") and "/CORP/DEPARTMENT/CONTRACTORS/PERSON" (e.g., the parent path of "/CORP/DEPARTMENT/CONTRACTORS/PERSON/@NAME") as the branch bottom paths, because they are the longest parent paths generated and neither is a subset or equal to the other. For each branch bottom path, the mapping unit 106 follows a branch bottom path to determine the result nodes. The values of the rows 624, 627, 630, 633, 636, 639 and columns 603, 606, 609, 612, 615, 618 of the mapped XML list 112 may be determined by following each branch bottom path to each corresponding field path.

Figure 7A:
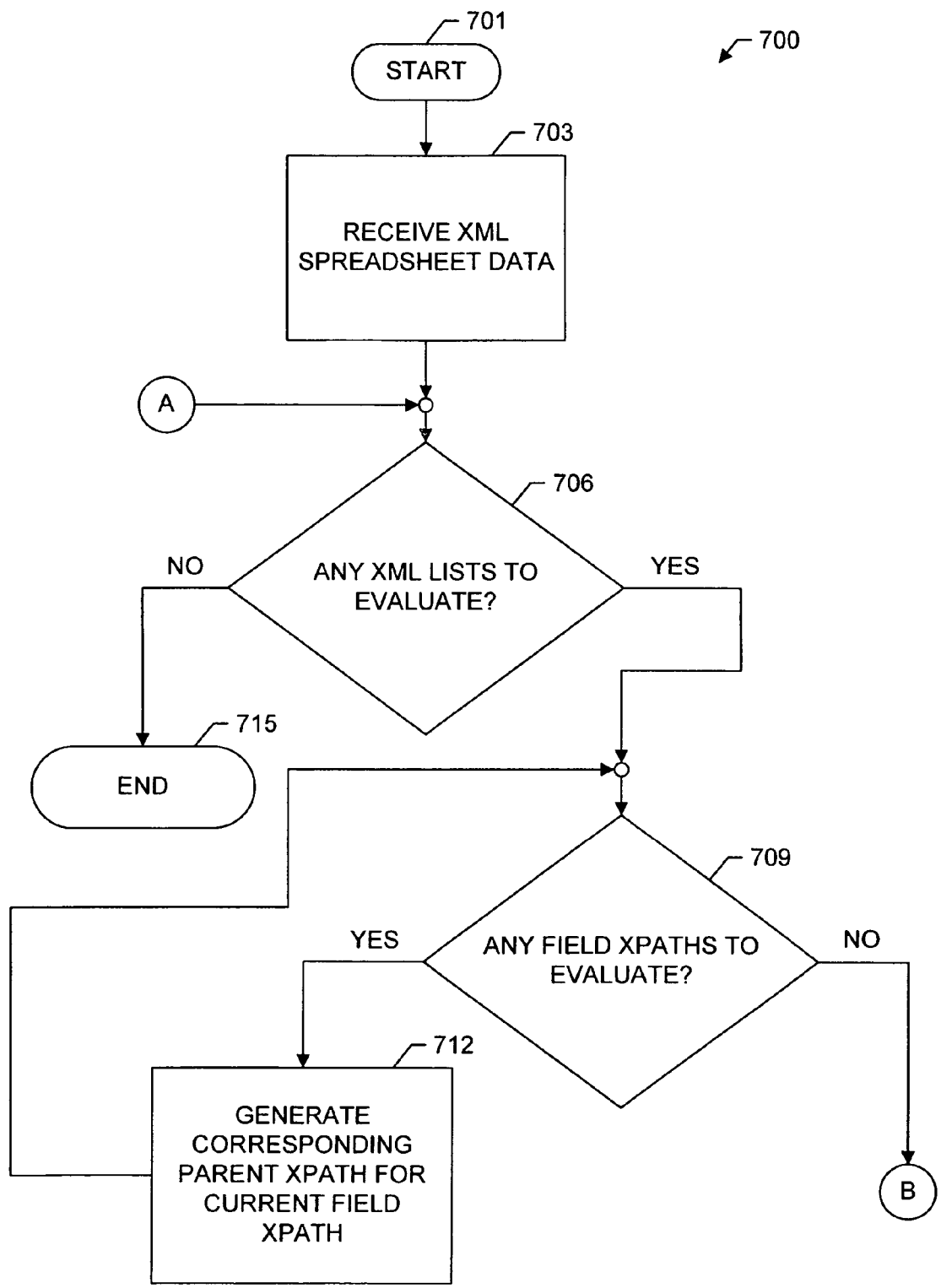
FIGS. 7A-7C display a flowchart representation of a method of mapping payload data to a spreadsheet list in accordance with an exemplary embodiment of the present invention.
Figure 7B:
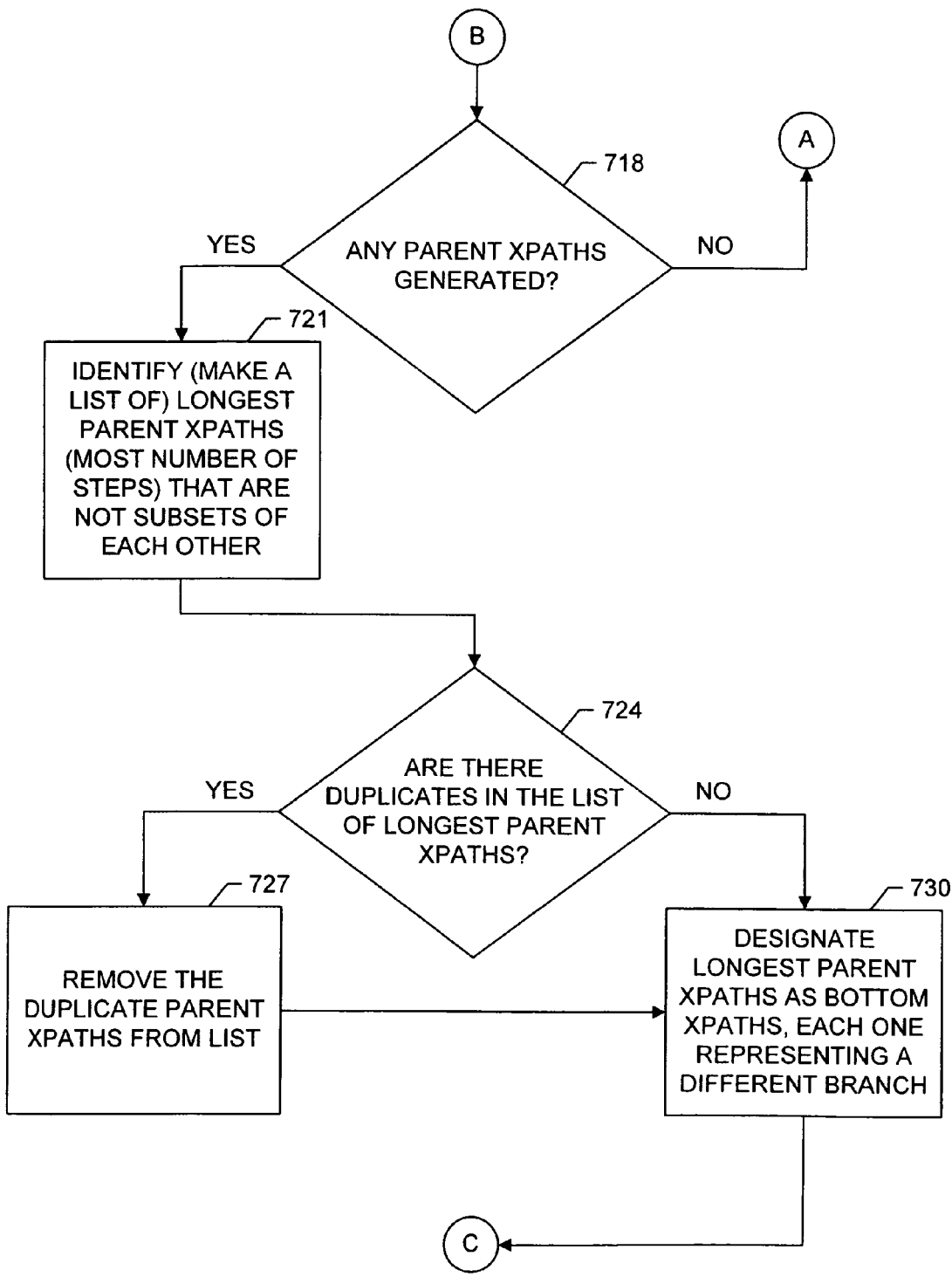
Figure 7C:
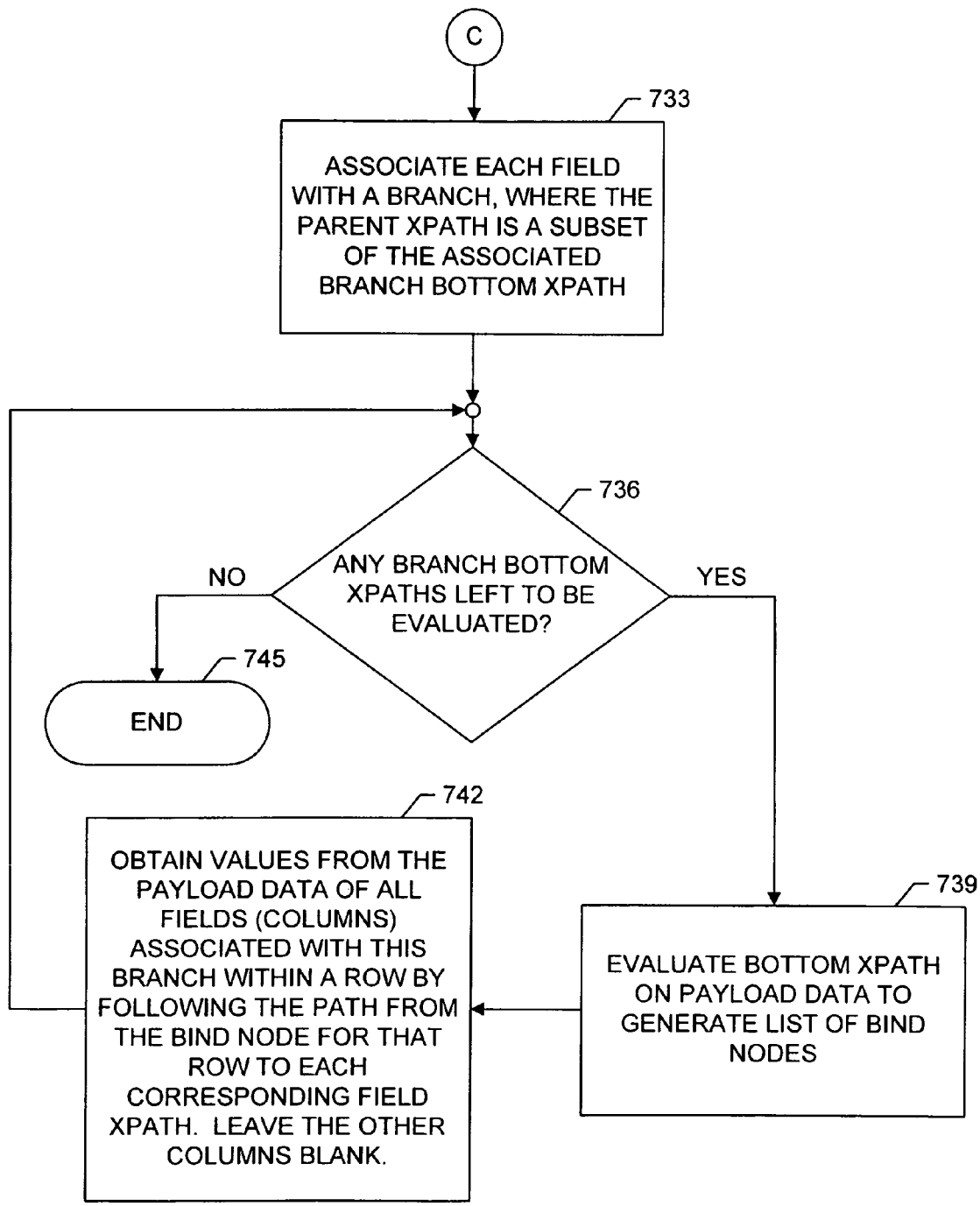

FIGS. 7A-7C display a flowchart representation of a method 700 of mapping payload data to a spreadsheet list 112 in accordance with an exemplary embodiment of the present invention. The mapping unit 106 maps payload data received from the payload storage unit 115 to an XML list received from the spreadsheet storage unit 109 without the use of a schema.

After starting at step 701, the mapping unit 106 proceeds to step 703 where the mapping unit 703 receives spreadsheet data from the spreadsheet storage unit 109. The spreadsheet data may include XML lists 112. Next, at step 706 the mapping unit 106 determines whether any XML lists 112 need to be evaluated. If, at step 706, the mapping unit 106 determines that no XML lists 112 need to be evaluated, then the mapping unit 106 halts operation in accordance with method 700 at step 715. If, however, at step 706 the mapping unit 106 determines that there exist XML lists 112 to be evaluated, then the mapping unit 106 proceeds to step 709 where the mapping unit 106 determines whether any field paths within an XML list 112 needs to be evaluated. If at step 709, the mapping unit 106 determines that no field paths need to be evaluated, then the mapping unit 106 proceeds to step 718, described below. If, however, at step 709 the mapping unit 106 determines that field paths exist that need to be evaluated, then the mapping unit 106 proceeds to step 712 where the mapping unit 106 generates a parent path for a field path. The mapping unit 106 then proceeds to step 709, described-above.

At step 718, the mapping unit 106 determines whether any parent paths were generated from the field paths of the XML list 112. If, at step 718 the mapping unit 106 determines that no parent paths were generated, then the mapping unit 106 proceeds to step 706 described above. Otherwise, if at step 718 the mapping unit 106 determines that parent paths were generated, then the mapping unit proceeds to step 721 where the mapping unit 106 identifies (makes a list of) the longest parent paths that are not subsets of each other. Next, at step 724, the mapping unit 106 determines if any duplicates exist within the list of longest parent paths. If at step 724 the mapping unit 106 determines that no duplicates exist within the list of longest parent paths, then the mapping unit 106 proceeds to step 730, described below. If, however, at 724 the mapping unit 106 determines that duplicates exist within the list of longest parent paths, then the mapping unit 106 proceeds to step 727 where the mapping unit 106 removes all duplicates within the list of longest parent paths.

Next, at 730, the mapping unit 106 designates each of the longest parent paths as bottom paths (also referred to herein as "branch bottom paths"), wherein each bottom path represents a different branch. Then, at 733, the mapping unit 106 associates each field of the XML list with one or more branch bottom path, such that the parent path of the field is a subset of the associated branch bottom path. The parent path of a field may be a subset of more than one branch bottom path. The mapping unit 106 then proceeds to step 736 where the mapping unit 106 determines whether any branch bottom path still needs to be evaluated. If, at 736, the mapping unit 106 determines that no branches bottom paths need to be evaluated, then the mapping unit 106 halts operation in accordance with method 700 at 745. Otherwise, if at 736 the mapping unit 106 determines that a branch bottom path exists that still needs to be evaluated, then the mapping unit 106 proceeds to 739 where the mapping unit 106 evaluates the branch bottom path on the payload data to generate a list of bind nodes. By grouping each parent path with one or more branch bottom path, the value, if any, of each field (column) of the XML list may be obtained from the payload data by traversing from the bind node. Next, at 742, the mapping unit 106 obtains values from the payload data of all the fields (columns) associated with the branch bottom path within a row by following the path from the bind node for that row to each corresponding field path. If a field belongs to a parent path that is not associated with the branch bottom path, then the field value remains empty. The mapping unit 106 then proceeds to step 736, described above.

Whereas the present invention has been described in detail it is understood that variations and modifications may be effected within the spirit and scope of the invention, as described herein before and as defined in the appended claims. The corresponding structures, materials, acts, and equivalents of all mean-plus-function elements, if any, in the claims below are intended to include any structure, material, or acts for performing the functions in combination with other claimed elements as specifically claimed.

What is claimed is:

1. A system for mapping payload data to spreadsheet lists, the system comprising:
    a processor that is configured to perform operations;
    a spreadsheet storage unit adapted to store spreadsheet data including at least one spreadsheet list using the processor, wherein the at least one spreadsheet list describes a spreadsheet structure including one or more fields included in a row of a spreadsheet and includes at least one path associated with a field; wherein the path identifies a location of payload data that is associated with the spreadsheet list;
    a payload data storage unit adapted to store payload data using the processor; and
    a mapping unit using the processor that is adapted to receive spreadsheet data from the spreadsheet storage unit, receive payload data from the payload data storage unit, and map the payload data to the at least one spreadsheet list independent of any schema associated with the payload data by generating a set of parent paths for the at least one path, determining at least one longest parent path of the set of parent paths, designating the at least one longest parent path as at least one branch bottom path, generating a set of nodes from payload data, wherein the set of nodes is generated by evaluating the at least one branch bottom; and retrieving a value of the field within a row of the spreadsheet list by tracing the bottom path to the at least one path associated with the field within the spreadsheet data and causing the spreadsheet to be displayed via an output device wherein the spreadsheet manifests the spreadsheet structure populated with the payload data.

2. The system of claim 1, wherein the at least one spreadsheet list includes extensible markup language (XML) lists.

3. The system of claim 1, wherein the system further comprises:
    a user interface adapted to receive the at least one mapped spreadsheet list from the mapping unit and display the at least one mapped spreadsheet list to a user.

4. The system of claim 1, wherein the system further comprises:
    a network interface adapted to receive the at least one mapped spreadsheet list from the mapping unit and provide the at least one mapped spreadsheet list to a network.

5. The system of claim 1, wherein the at least one spreadsheet list includes at least one field path associated with the payload data.

6. The system of claim 1, wherein the mapping unit is further adapted to map the at least one result node to a row in a spreadsheet list.

7. The system of claim 6, wherein the row includes a plurality of fields, and wherein the mapping unit is further adapted to obtain values for the plurality of fields by using the at least one branch bottom path and the at least one result node with the payload data.

8. A method for mapping payload data to spreadsheet lists, the method comprising the steps of:
    using a processor, receiving spreadsheet data including at least one spreadsheet list, wherein the at least one spreadsheet list describes a spreadsheet structure including one or more fields included in a row of a spreadsheet and includes at least one path associated with a field; wherein the path identifies a location of payload data that is associated with the spreadsheet list;
    using the processor, receiving payload data, wherein the payload data is associated with the spreadsheet data; and
    using the processor, mapping the payload data to the at least one spreadsheet list by generating a set of parent paths for the at least one path, determining at least one longest parent path of the set of parent paths, designating the at least one longest parent path as at least one branch bottom path, and generating a set of nodes from payload data, wherein the set of nodes is generated by evaluating the at least one branch bottom and retrieving a value of the field within a row of the spreadsheet list by tracing the bottom path to the at least one path associated with the field within the spreadsheet data; and causing the spreadsheet to be displayed via an output device wherein the spreadsheet manifests the spreadsheet structure populated with the payload data.

9. The method of claim 8, wherein mapping the payload data to the at least one spreadsheet list by using the at least one path further comprises the steps of:
    mapping a node of the set of nodes to a row of the at least one spreadsheet list; and
    retrieving a value of the field within the row by tracing the at least one branch bottom path to the at least one path associated with the field within the spreadsheet data.

10. The method of claim 8, wherein generating a set of parent paths for the at least one path comprises the steps of:
    enumerating the at least one path of the spreadsheet data;
    following enumerated the at least one path back to a previous field; and
    inserting a path associated with the previous field into the set of parent paths.

11. The method of claim 8, wherein designating at least one parent path of the set of parent paths as at least one branch bottom path comprises the steps of:
    designating the at least one longest parent path as at least one branch bottom path, if a first parent path of the at least one longest parent path is not a subset of a second parent path of the at least one longest parent path.

12. The method of claim 8, the method further comprising the steps of:

associating a third parent path of the set of parent paths with the at least one branch bottom path, wherein the third parent path is a subset of the at least one branch bottom path.

13. A computer-readable storage medium comprising computer-executable instructions for mapping payload data to spreadsheet lists, the computer-executable instructions performing the steps of:

receiving spreadsheet data including at least one spreadsheet list, wherein the at least one spreadsheet list describes a spreadsheet structure including one or more fields included in a row of a spreadsheet and includes at least one path associated with a field; wherein the path identifies a location of payload data that is associated with the spreadsheet list;

receiving payload data, wherein the payload data is associated with the spreadsheet data; and mapping the payload data to the at least one spreadsheet list by generating a set of parent paths for the at least one path, determining at least one longest parent path of the set of parent paths, designating the at least one longest parent path as at least one branch bottom path, and generating a set of nodes from payload data, wherein the set of nodes is generated by evaluating the at least one branch bottom and retrieving a value of the field within a row of the spreadsheet list by tracing the bottom path to the at least one path associated with the field within the spreadsheet data; and causing the spreadsheet to be displayed via an output device wherein the spreadsheet manifests the spreadsheet structure populated with the payload data.

14. The computer-readable medium of claim 13, wherein mapping the payload data to the at least one spreadsheet list by using the at least one path further comprises the steps of:

mapping a node of the set of nodes to a row of the at least one spreadsheet list; and retrieving a value of the field within the row by tracing the at least one branch bottom path to the at least one path associated with the field within the spreadsheet data.

15. The computer-readable medium of claim 13, wherein generating a set of parent paths for the at least one path comprises the steps of:

enumerating the at least one path of the spreadsheet data;

following enumerated the at least one path back to a previous field; and inserting a path associated with the previous field into the set of parent paths.

16. The computer-readable medium of claim 13, wherein designating at least one parent path of the set of parent paths as at least one branch bottom path comprises the steps of:

designating the at least one longest parent path as at least one branch bottom path, if a first parent path of the at least one longest parent path is not a subset of a second parent path of the at least one longest parent path.

17. The computer-readable medium of claim 13, the computer-executable instructions further performing the steps of:

associating a third parent path of the set of parent paths with the at least one branch bottom path, wherein the third parent path is a subset of the at least one branch bottom path.

* * * * *